Feb. 3, 1970 P. BELOKIN, JR 3,493,102
TACKLE AND UTILITY BOX
Filed April 25, 1968 3 Sheets-Sheet 1

INVENTOR
PAUL BELOKIN, JR.
By Harbaugh & Thomas
Attorneys

Feb. 3, 1970   P. BELOKIN, JR   3,493,102
TACKLE AND UTILITY BOX
Filed April 25, 1968   3 Sheets-Sheet 2

INVENTOR
PAUL BELOKIN, JR.

By Harbaugh & Thomas
Attorneys

Feb. 3, 1970 P. BELOKIN, JR 3,493,102
TACKLE AND UTILITY BOX
Filed April 25, 1968 3 Sheets-Sheet 3

INVENTOR
PAUL BELOKIN, JR.
By Hartaugh & Thomas
Attorneys

United States Patent Office 3,493,102
Patented Feb. 3, 1970

3,493,102
TACKLE AND UTILITY BOX
Paul Belokin, Jr., 6919 W. 43rd St.,
Berwyn, Ill. 60402
Filed Apr. 25, 1968, Ser. No. 723,995
Int. Cl. B65d 85/64
U.S. Cl. 206—16    4 Claims

ABSTRACT OF THE DISCLOSURE

The disclosure describes a tackle or utility box formed of a pair of substantially identically shaped molded members having converging top and bottom walls and integral side and end walls, with matching inner open sides, hinged to each other along one edge so that in closed position the molded members adjoin along their edges at their open sides to form an enclosure and in open position the sides of said members adjacent the hinge fold out into a flat weight-supporting base with the open inner sides directed upwardly and at an angle to each other. In one embodiment at least one compartmented tray is included, hinged at its bottom across the open inner side of one of the molded members and recessed flush with the edge, with the open truncated ends of each compartment positionable in a closed position adjacent a side wall and positionable in an open position at an angle to the plane of the open side but with the truncated ends readily accessible to place objects therein or remove objects therefrom. Provision is also made for storage compartments between the converging top and bottom walls of either molded member and for compartments under the hinged compartmented trays. In the closed position the sides of the hinged compartmented trays serve as covers for the fixed compartments in both molded members and in open position the trays can be rotated to provide access to the compartments. Other embodiments are disclosed.

BACKGROUND OF THE INVENTION

The invention concerns a tackle or utility box which is lightweight, readily and inexpensively formed from molded plastic parts, closes in a manner such that the weight of objects therein has a lesser tendency to open the box, and which in open position provides a flat, stable base which is more than twice the width of any side of the box. The invention also concerns a box of this nature wherein compartmented trays are provided which in their closed position seal or close each other and also seal or close other compartments in the box.

Tackle and utility boxes have a generally rectangular configuration with lids and top latches to which are affixed centrally disposed outside handles. The inadvertent release of the latch while carrying the box allows the lid to open and the bottom hinges downwardly to allow the contents to spill out. Boxes of this nature do not provide readily accessible compartments which are closed without provision for supported or hinged cover members or sliding walls. In some tackle boxes the area of the base remains the same whether the tackle box is in open or closed position. In still other tackle boxes, the box is less stable in its open position than when closed because of the open position of the cover or lid. Because of the nature and the manner in which the lid members are attached, auxiliary linkages are provided to hold the lids in open position. These become bent or loose during use and do not always function properly, or tend to fold upon hooks and lines and are a nuisance to the fisherman. Tackle boxes formed of metal are a source of unnecessary noise and are difficult to protect from corrosion. Aluminum tackle boxes are easily bent and their riveted construction is not always suitable.

In accordance with this invention a tackle box is provided which avoids these and other drawbacks of the boxes of the prior art. In one embodiment of the invention, a tackle box is provided which is formed, except for the hinge and latch members, entirely of plastic and is readily opened and closed without the danger of spillage, entangling the tackle and can be made of plastic so as to incorporate all of the advantages of strength, lightness of weight and sound deadening qualities of this material.

SUMMARY OF THE INVENTION

The instant invention provides a tackle or utility box, having a pair of substantially identically shaped molded hollow members each forming a half of the box. The molded members have converging top and bottom walls and integral narrow side walls with triangular-shaped end walls. Each molded member has an inner open side with a planar edge and is hinged along one of the edges to the other half having an off-set flange so that in the closed position the members adjoin along the interlocking or over-lapping edges to form a practical sealed enclosure. An integral molded opening is provided through a side at the top edge of each molded member, opposite to the hinge side, which become in closed position a full handle and in itself keeps the molded members together by the gripping action of one's hand. In open position the sides of the molded members adjacent to the hinge move into a common plane which serves as a flat, weight-bearing support for the contents of the box. In this position, the open sides of each of the molded members are directed angularly toward each other on the upper side of the box so that the entire contents can be readily surveyed and various items of the contents removed without disturbing the other items.

This invention also provides one or more compartmented transparent trays in the box which are hinged along their closed bottoms across an open side of one or both molded members. The open ends of each transparent compartment are truncated at an angle so that in closed position the opening of the top-most tray is contiguous to the inside of the molded member and the openings of the lower trays are contiguous to the bottom of the next upper tray. This serves to retain the contents in each tray under all conditions of use. The transparent compartmented trays are side-to-side in closed position and on opening the box remain in their respective molded housings constituting the outer wall of the box. These compartmented trays are adapted to be swung in an angle of about 90° to an open position wherein their truncated open ends are directly upwardly for easy access of the contents. The open trays on one side are automatically closed, one against the other, by merely closing molded housing halves together.

DESCRIPTION OF THE DRAWINGS

One embodiment of this invention is shown in the drawings, wherein.

THE PREFERRED EMBODIMENT

Figure 1:
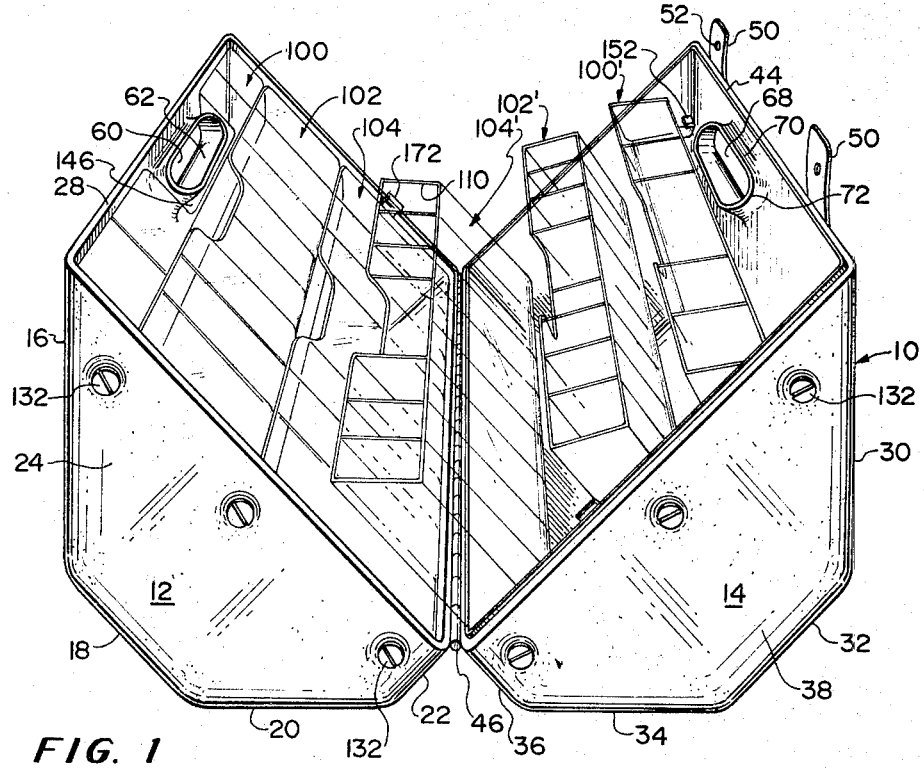
FIG. 1 is a perspective view of a tackle box, formed in accordance with this invention shown in one of its open positions.
Figure 2:
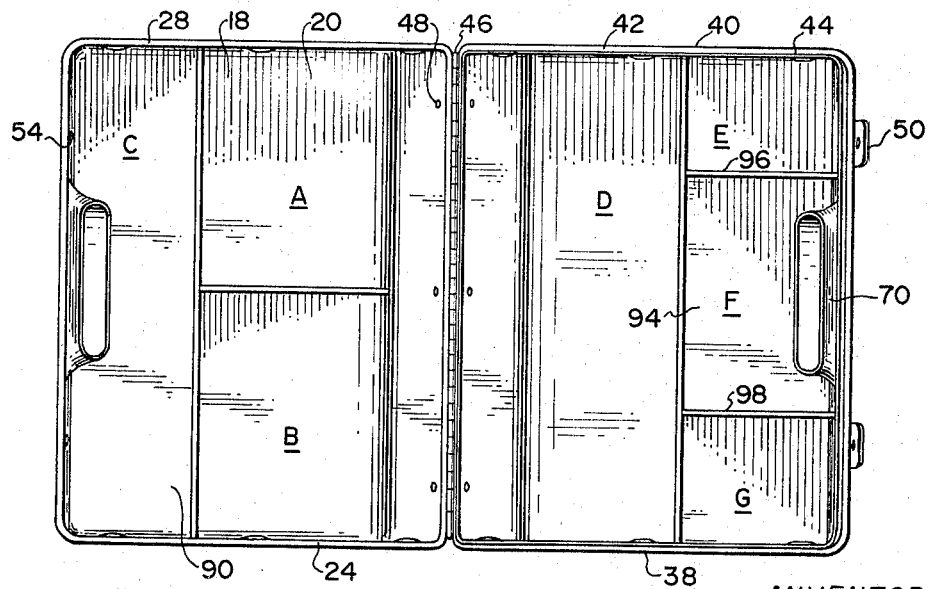
FIG. 2 is a top view of the tackle box in open position resting on a horizontal surface with the transparent trays removed.
Figure 3:
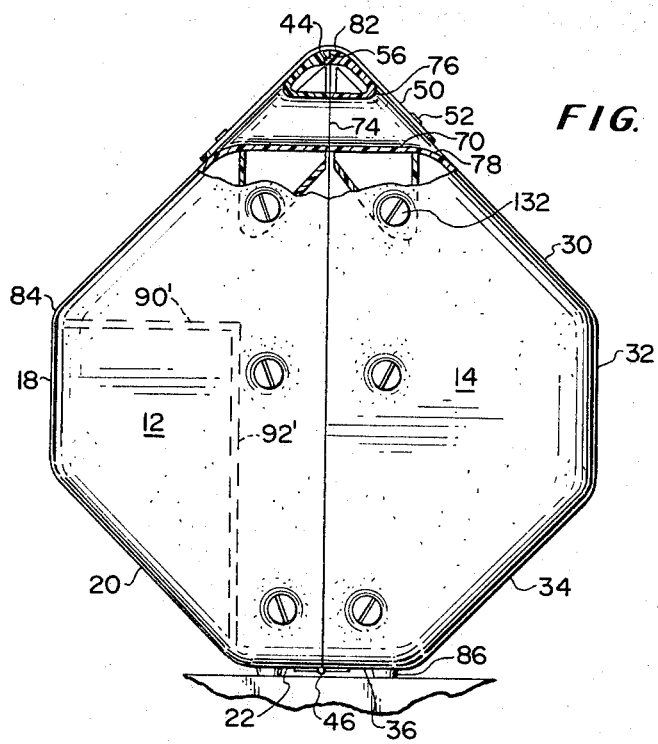
FIG. 3 is an end view of the tackle box in closed position and partially sectioned to show the details of the handle.

Referring to the drawings, particularly FIGS. 1, 2 and 3, there is shown one embodiment of a tackle box 10 comprising a pair of molded members 12 and 14 which can be identical, that is, formed from the same mold, or, depending on the configuration desired can be substantially identical with different inner compartments and different opposing edges, as will be described, to interlock or over-lap in closed position. In the preferred embodiment shown, the molded member 12 has a top wall 16, a side wall 18 and a lower wall 20 with a base wall 22, joined as an integral hollow unit with the end walls 24 and 26. The walls 16 and 20 converge toward and are truncated by the side wall 18 and the inner edge 28, common to these parts, is flat and planar.

Similarly, the molded member 14 has a top wall 30, a side wall 32, a lower wall 34 and a base wall 36 joined together by the end walls 38 and 40 to form a second hollow unit. The edge 42 of the molded member 14 is flat and planar so as to abut against the edge 28 and has, in this embodiment, an upstanding flange 44 extending around the internal periphery so as to fit just inside and contact the inner periphery of the continuous edge 28 in the closed position as shown in FIG. 3.

The two molded members are held together by the elongated piano-type hinge 46, affixed to the outer edges of the base walls 22 and 36 by means of the rivets 48. A pair of pliant straps 50 are attached to the outer surface of the wall 30 of the molded member 14, said straps having the snap fastenings 52 affixed to their free ends. The top wall 16 of the molded member 12 carries a pair of spaced snap fastenings 54 (FIG. 2), the rivet end only showing, which are so positioned and aligned with the snap fastenings 52 so that when the molded members 12 and 14 are in the closed position the straps 50 extend over the juncture 56 of the matching edges 28 and 42 to hold same in juxtaposition. The pliant straps 50 may be made of leather or plastic and provided in any desired length or width and only one such fastening may be used. Also other means for releasably holding the two halves of the tackle box together can be used including latches formed of metal which can be locked.

The molded member 12 has an oval-shaped hand opening 60 formed by the integral molded, curved-walled flange 62 located near the top edge 28 and extending inwardly as part of the wall 16. This flange terminates in the flat oval edge 64 which is coplanar with the edge 28. The hand opening 60 is substantially midway between the end walls 24 and 26 and has a rounded top edge 64 (FIG. 3) and a smooth downward contour 66 which are spaced from each other sufficiently to allow the hand of the user to pass therethrough. The molded member 14 has the matching integral oval shaped hand opening 68 formed within the top wall 30, opposite the hand opening 60, formed by the curved flange 70 having the inner edge 72 coplanar with the flat edge 42 of the molded member 14. The hand openings 60 and 68 are of the same size and oval configuration so that in the closed position the edges 64 and 72 meet circumferentially therearound forming the juncture 74. If desired, one or both of the edges 64 and 72 can have a flange, such as the flange 44 to interlock these members. The curved edges 76 and 78 conform to the edges 64 and 66, respectively, for uniform appearance. It is to be observed that in the closed position the matching curves 64 and 76 of the flanges 62 and 70 and the matching curved edges 80 and 82 of the opposed walls 16 and 30 form a rounded handle member in the closed position.

The other corners 84 of the molded members are similar curved to give over-all uniformity and strength to these members. Also in the closed position the base walls 22 and 36 form a flat bottom upon which the tackle box is readily supportable. The hinge 46 can be recessed in the bottom or spaced rubber feet 86 can be attached to the bottom wall to present a flat supporting surface. The device thus far described comprises one embodiment of this invention, with no inner compartments or trays (to be described), same having utility as a general purpose container or designed as a holder for a bowling ball or the like.

In another embodiment of this invention, shown in FIG. 2, the two molded members 12 and 14 have an arrangement of integral upstanding walls to form compartments therein. This view shows the device of this invention opened to a position wherein it is resting on the walls 20 and 34 as in FIG. 1. The device of this invention can be opened further to a second position so that the side walls 18 and 32 are in a common plane and rest upon a supporting surface, in which position the edges 28 and 42 are coplanar. In either position the compartments are readily accessible, is substantially parallel to the base wall 22 of the molded member 12 and joined to or integral with the inside of the molded member with its base at or near the curved corner 84, i.e., the juncture of the top wall 16 and the side wall 18. A second vertical transverse wall member 92 extends from the base wall 22 and lower wall 20 in the same manner and joins the wall 90 at any desired point therealong, i.e., to form the equal sized compartments A and B shown in FIG. 2. The compartment C, formed by the wall 90, is V-shaped. The molded member 14 has a similar arrangement of vertical walls 94, 96 and 98, in this instance forming four compartments D, E, F and G in this half of the container device. The top edges of the walls 9–98 shown in FIG. 2 can extend upwardly to the plane of the respective edges 28 and 42, thus forming a tackle box having seven separate compartments. When closed, the edges of these walls are contiguous and in the plane of the juncture 74.

In another embodiment of this invention the wall compartments just described can have their heights foreshortened as shown by the dotted lines 90' and 92' in FIG. 3 so that their top edges are recessed below the edges 28 and 42 with a similar spacing provided for the top edges of the walls 94, 96 and 98 in the molded member 14. This provides a recess in which the trays 100, 102 and 104 (FIG. 1) fit in a pivotal relationship, being held by means of the end walls 24 and 26. The molded member 14 has similar set of trays 100', 102' and 104' pivotally mounted therein. The bodies of the trays are formed of clear tough plastic with a pair of parallel spaced side walls 106 and 108, the end walls 110 and 112 and a plurality of spaced partitions 114 forming elongated compartments 116 herein (see FIG. 4). The top edge of the walls are truncated at an angle as indicated at 118 so that in their closed condition the bottom corners 120 and the truncated bottom walls 122 (FIGS. 10 and 12) form top closures for the trays 102 and 104 or conversely 102' and 104' in the molded member 14. The side or end walls 110 and 112 of each tray have a shoulder 130 (FIG. 9) spaced above the bottom walls 122 into which a flat head screw 132 engages to provide a fulcrum about the boss 134 which extends through an aperture 136 in the side walls. The head of the screw 132 is made flush with the outer wall by means of the recess 138.

Figure 4:
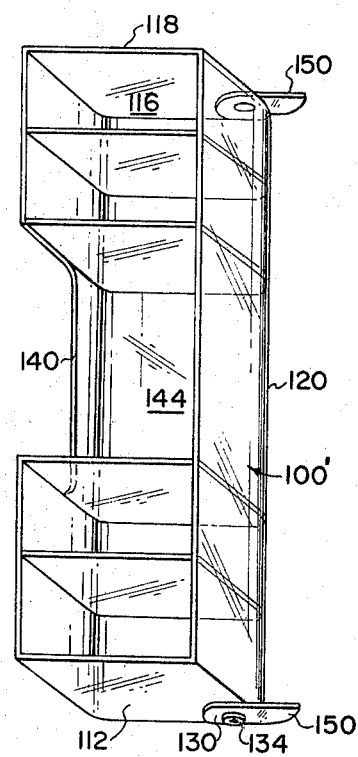
FIG. 4 is a top perspective view of one of the inner trays.
Figure 5:
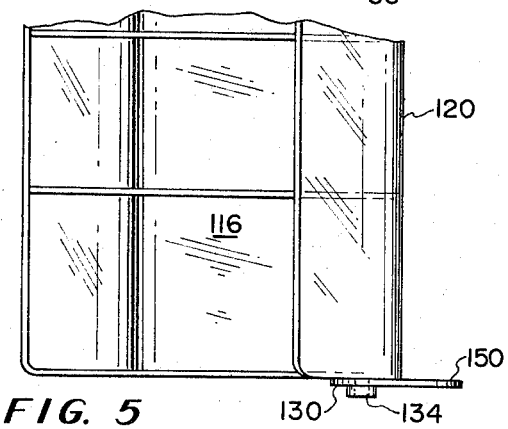
FIG. 5 is a fragmentary top plan view of one of the inner trays.

In the embodiment shown the tray 100 has a cut-a-way section 140 (FIG. 1) which encompasses the oval flange 62 of the handle portion of the molded member 12. A similar cut-a-way section 140' is provided in the top-most tray 100' of the molded member 14. This forms in each top tray an elongated V-bottom compartment 144 (FIG. 4). Sufficient space (FIG. 1) as indicated at 146 is provided to insert the finger tip to engage these topmost trays and pull same to the open position.

The shoulder 130 of the topmost trays 100 and 100' have a catch arm 150 made integral therewith which engages on the underside of the protuberance 152 (FIG. 1) on the inside of the wall 30 to hold the top trays in their open position and prevent their falling into the void left by the opening of the next adjacent trays 102.

Figure 6:
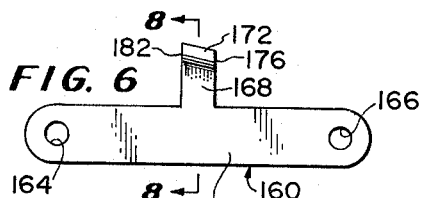
FIG. 6 is a side plan view of the latch spring used to hold the trays in closed position.
Figure 8:
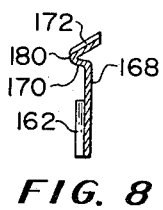
FIG. 8 is a cross-sectional view taken along the lines 8—8 of FIG. 7.
Figure 7:
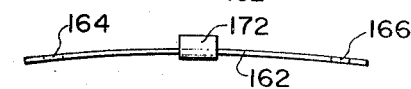
FIG. 7 is a top plan view of the latch spring used in accordance with this invention.

Referring to FIGS. 6, 7 and 8, the latch spring 160 is shown comprising an elongated bowed body member 162 with the bore holes 164 and 166 at either end. Intermediate the ends there is provided an upstanding tab member 168 with an off-set edge or shoulder 170 and the reverse bent tab 172, which functions as a finger pressure point for unlatching the device and also as a cam surface to allow the closing of the trays 104 and 104' without having to touch the latch.

Figure 9:
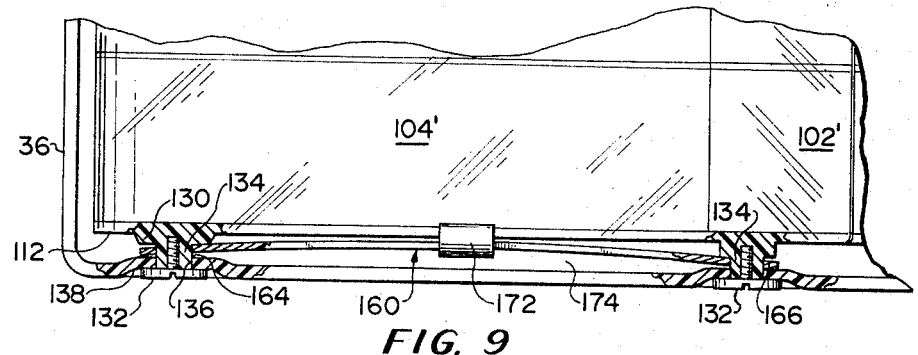
FIG. 9 is a fragmentary view in partial cross-section, to show the interengagement of the latch spring with the edge of a tray.

As shown in FIG. 1 the latches 160 are placed on opposite ends of the molded members 12 and 14 and the partial sectional view in FIG. 9 shows the manner in which the latches 160 fit within the space 174 between the end wall 112 of the tray 102', for example, and the end wall 38 with the bore holes 164 and 166 engaging or encompassing the bosses 134 held by the screws 132. In closed position, the arched spring body 162 holds the shoulder 170 on top of the wall 108. Simply by pressing the tab 172 against the spring action of the body 162 the shoulder 170 clears the corner of the wall 108 and allows the tray 104' to be released. A latch 160 is similarly affixed to the pivot points of the trays 102 and 104 on the opposite end of the device as shown in FIG. 1, the tab 172 only showing in this view. If desired the latches 160 can be on the same end of the molded members. The two latches are identical and interchangeable. The shoulder member 130 cooperates to hold the trays in the spaced relationship from the end walls so that the spring body 162 has room to flex slightly. The bores 164 and 166 are loose fitting in the bosses 134 to allow for the lengthening of the spring body 162 when pushed to its release position.

Since the trays overlap as shown in FIG. 1, the locking of the trays 104 and 104' holds the remaining trays in place. Either side is opened by merely pressing the appropriate tab 172 inward and lifting the individual tray 104 or 104', by lifting the trays 102 and 102' which carry the trays 104 and 104' therewith, or by lifting the trays 100 or 100' whereby all of the trays on that side are opened to assume the positions shown for the trays in the molded member 14 in FIG. 1. The space 174 (FIG. 10) between the trans 104 and 104' in their respective molded members 12 or 14 is such that these trays can assume the sloping position shown for the tray 104' in FIG. 1 or can be tilted to a more upright position by opening the molded members further so they rest on the walls 18 and 32. Once the catches 160 are released and the trays opened up they can be moved individually to any position as desired, to gain access to the lower compartments A–G. On closing the face and edge 176 of the finger tab 172 form a cam which strikes against the corner 178 of the trays 104 or 104' to spring the body 162 from its bowed or released position, the corner 180 then rides against the end wall 112 until the shoulder 170 engages over the edge of the wall 108. The upper edge 182 of the tab 172 acts as a stop member for the intermediate tray 102 to hold it in an upright position and spaced from the adjacent tray 104 so that it can be easily swung out of the way or the contents below can be seen.

Figures 10, 11:
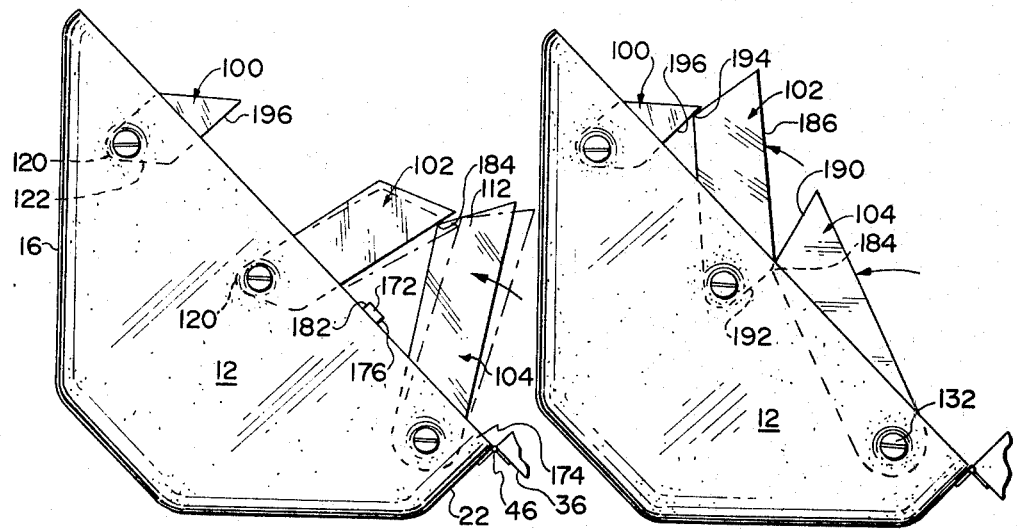
FIG. 10 is a fragmentary end view showing the hinged trays in a first position during closing one upon the other.
FIG. 11 is a fragmentary end view, like FIG. 10, showing an intermediate position of the trays during closing.
Figure 12:
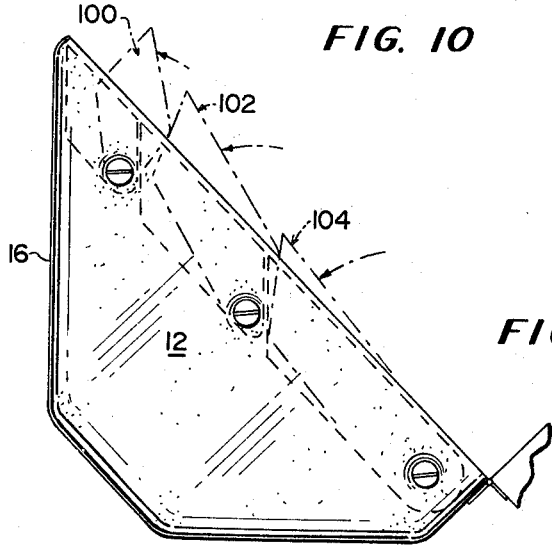
FIG. 12 is a fragmentary view like FIGS. 10 and 11 showing the rear closing position of the trays.

In FIGS. 10, 11 and 12 the tackle box of this invention is shown in a manner to illustrate how the trays in either molded member 12 or 14 cooperate to close one another in sequence through their hinged arrangement and the shape of their truncated tops and rounded or truncated bottoms. In FIG. 10 the tray 104 is being raised from its open dotted line position in the direction of the arrow and the corner 184 is camming against the front top wall 186 of the tray 102. Further pivoting of the tray 104 brings the corner 184 to the position in FIG. 11 where the corner 184 has cleared the wall 186 and the truncated edge 190 begins to cam agains the bottom 192 of the tray 102 at the same time the corner edge 194 of the tray 102 has been carried into contact with the front wall 196 of the tray 100. In FIG. 12 the truncated tops and bottoms of the trays are in contact and the continued rotation of the tray 104 is about to close the trays in their nested dotted line position.

From the foregoing description of this invention, it is apparent that changes in the size, shape and arrangement of the parts can be made without department from the spirit or scope thereof. Although the catch member 172 is shown connected between the pivot points of trays 102 and 104 on one side and trays 102' and 104' on the other side, the catch members can be connected between trays 100 and 102 or 100' and 102' and also they may be located on the same ends of the pivot points, instead of on opposite ends as illustrated in FIG. 1. The box of this invention can be used with or without the folding trays on either or both molded members 12 and 14.

What is claimed is:
1. A utility box comprising:
(a) a pair of hollow open sided members hinged to each other along one edge with their open sides facing each other;
(b) the remaining edges of said hollow members being adapted to abut each other in closed position about said hinge;
(c) said hollow members having lower substantially flat side wall portions joined to substantially flat bottom portions along said one edge;
(d) means to hold said hollow members in closed position with their edges in said contiguous relationship to define an article carrying-space therebetween;
(e) whereby in said closed position said flat bottom portions are substantially coplanar and said flat wall portions are diverging and in open position said flat wall portions are coplanar to provide a wider flat weight-bearing base for said utility box in open position;
(f) a pair of compartmented trays is provided in one of said hollow members;
(g) said trays having open truncated tops and enclosed truncated bottoms and being pivotally mounted between the end walls of said hollow member in an axis spaced from and substantially parallel to said hinge member; and
(h) the truncated tops and bottoms of said trays being at an angle to the sides of said trays whereby in closed position the open top of one of said trays is in juxtaposition to the bottom of the other tray and in closing said trays said truncated top cams against the side and bottom of the other tray.

2. A utility box in accordance with claim 1 in which:
(a) a catch member is provided at the end of said trays to hold said trays in closed position and said latch member acts as a stop for the other tray in open position.

3. A utility box in accordance with claim 2 in which:
(a) said catch member comprises a leaf spring having bore holes at the ends encompassing the spaced axes of adjacent trays;
(b) said spring having a tab member extending to the level of the outer walls of one of said trays in its closed position;

(c) a shoulder on said tab engageable with and over the top edge of said outer wall of said one tray;
(d) a beveled finger tab extending from said shoulder;
(e) said spring member urging said shoulder over the top edge of said one tray;
(f) and said beveled finger tab operating as a stop member for said other tray in open position.

4. A utility box in accordance with claim 1 in which:
(a) a series of said compartmented trays is provided in each of said hollow members with a catch member at the opposite ends thereof;
(b) the truncated top edge of each of said trays being adapted to engage the outer side of the next upper tray in the series when pivoted from an open to a closed position whereby pivoting the lowermost tray closes the series of trays in sequence;
(c) and the truncated top edge of all but the topmost tray in each hollow member finally engages and cams against the truncated bottom of the succeeding tray to hold the series in closed position as said beveled finger locks over the top edge of one of said trays in the respective hollow member.

References Cited

UNITED STATES PATENTS

| 708,489 | 9/1902 | Morris | 190—16 |
| 2,785,036 | 3/1957 | Elsden-King et al. | 312—327 |
| 3,334,714 | 8/1967 | Gordon | 190—57 |
| 3,337,028 | 8/1967 | Glavan | 206—1 |

FOREIGN PATENTS 205,620    1/1957    Australia.

WILLIAM T. DIXSON, Jr., Primary Examiner

U.S. Cl. X.R.

312—200, 327